Sept. 11, 1956           P. TERRY           2,762,628
DUMP TRUCK WITH WIDE RANGE MATERIAL SPREADER
Filed June 30, 1954           2 Sheets-Sheet 1
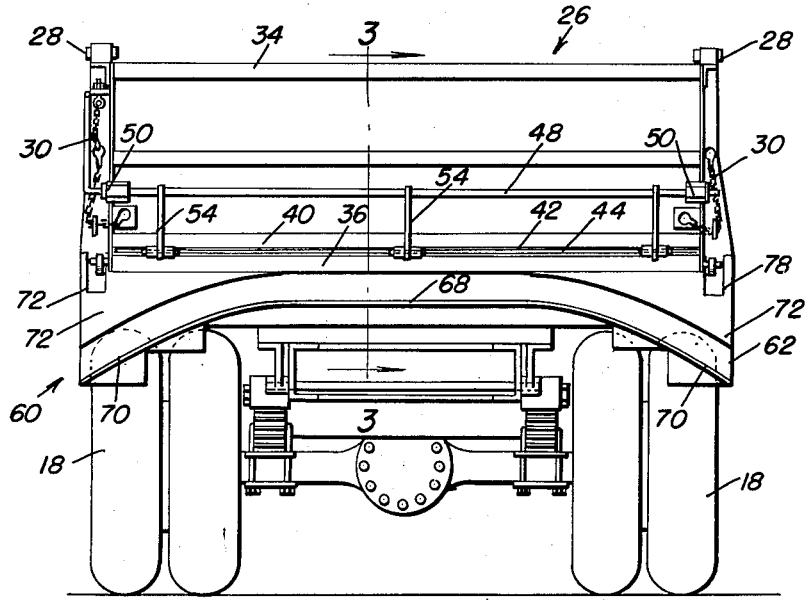
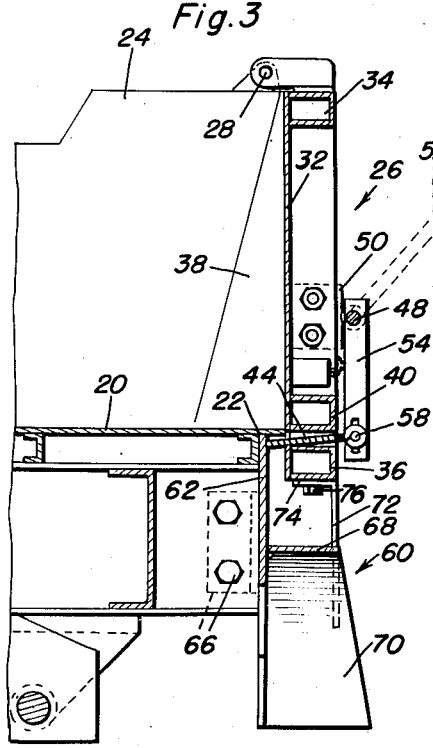
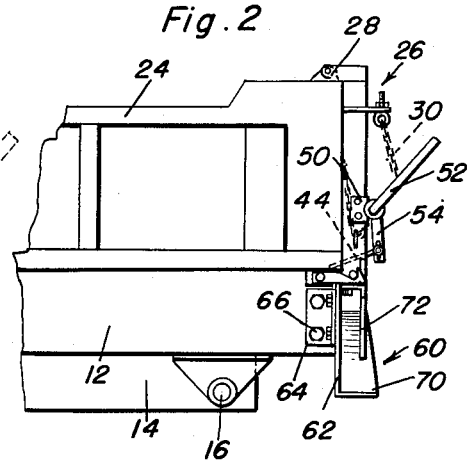
Preston Terry
INVENTOR.

Sept. 11, 1956         P. TERRY         2,762,628
DUMP TRUCK WITH WIDE RANGE MATERIAL SPREADER
Filed June 30, 1954         2 Sheets-Sheet 2
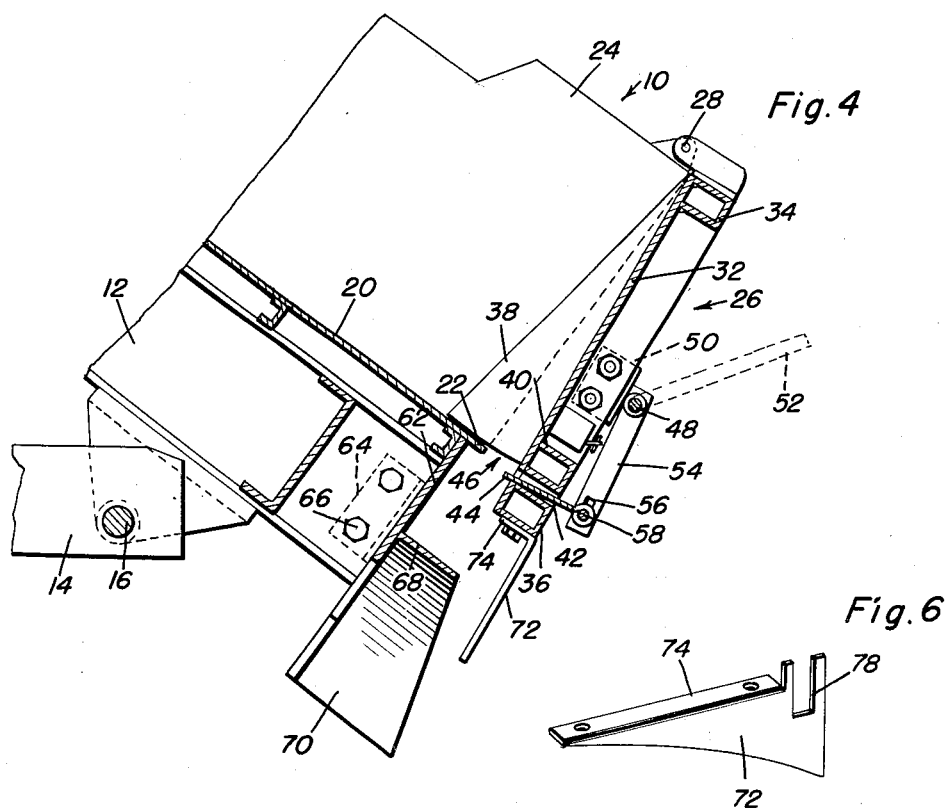
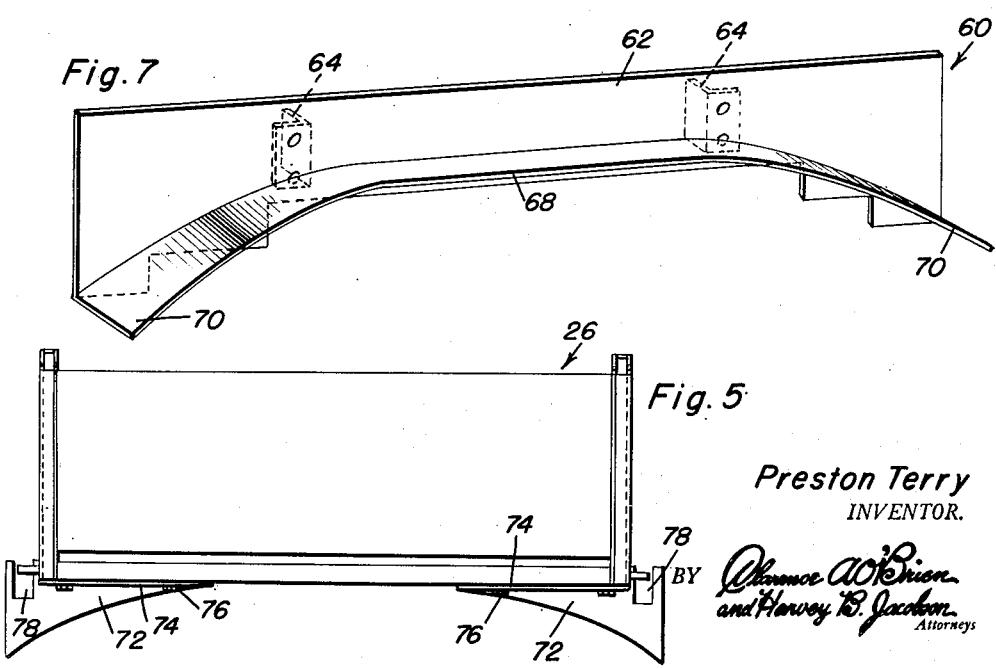
Preston Terry
INVENTOR.

United States Patent Office 2,762,628
Patented Sept. 11, 1956

2,762,628

DUMP TRUCK WITH WIDE RANGE MATERIAL SPREADER

Preston Terry, Overland, Mo.

Application June 30, 1954, Serial No. 440,322

4 Claims. (Cl. 275—14)

The present invention relates to material handling and spreading means, generally classified, and has reference in particular to a conventional type dump truck, the rear dumping end of which is especially constructed to effectually spread and uniformly distribute aggregate or other materials over an earth surface, for example, a highway, road or the like.

It is highly desirable in asphalt paving requirements and similar jobs that the aggregate, such as gravel and rocks, be spread to an extent which is at least as wide as the distance between outside walls of the left and right truck tires and, in so doing, allow the wheels to ride upon the spread gravel and to thus prevent the tires from picking up the asphalt and causing it to cling to the surfaces of the tires. It is therefore an object of the instant invention to provide and utilize a novel distributive type of spreader construction which accomplishes the intended and desired wide range aggregrate spreading and depositing results.

Another object of the invention is to provide the customary or usual tailboard or gate with simple, practicable and readily controllable material valving means which is such that it is possible to aptly and satisfactorily regulate the size of the gap or space between the rear end of the dump body bed and forward surface of the swingable lower end of the tail gate with the idea in mind that the amount of material passing through said gap is regulable and with the result that the material which is spread is regulated thereby, this in conjunction with the rate of speed at which the truck is skillfully handled by the driver.

Briefly summarized, the preferred form of the invention is characterized by a wheel supported dump truck body having an openable material dumping end and including a horizontal bottom providing bed and vertical side confining walls cooperable therewith, a rearwardly and outwardly swingable tail gate hinged at its upper end between the upper portion of said side walls, material regulating and valving means operatively mounted on said tail gate, and cooperable with said bottom, and material distributing and spreading means supported beneath the rear material discharge end of said bottom, lower edge of said tail gate, and also said valving means.

Novelty is further predicated on the structural means above recited and wherein said spreading means completely spans the open discharging or dumping end and has end portions projecting beyond the side walls of the truck body and overlying the rear supporting wheels and extending, of course, to points as far out as the outer side walls of the tires of the outermost wheels so that the material which is spread makes a path wide enough for the wheels to travel on.

Novelty is also predicated on the attachment aspects of the several components which go to make up the overall combination, for example, a spreader unit which is characterized by a vertical baffle plate having brackets whereby it may be secured to the existing or stock parts of the truck frame and so that said plate may then depend at right angles from the projecting rear end of the bed of the truck to serve as an apron, the same having a lateral or right angularly disposed flange which functions as a material depositing and distributing ledge, said flange being preferably arched or arcuate to ensure best results.

Novelty is also predicated on the provision of additional or auxiliary baffles which cooperate with the first named baffle plate and which are also simple attachments which can be applied to and subsequently removed from, if desired, the lower edge of the standard tail gate.

Then, too, novelty is predicated on that phase of the invention which has to do with a simple and practicable valving device, one which bridges the gap or space between the tail gate and rear end of the bottom of the truck body and is unique in that it is slidably mounted in the slot provided therefor in a modified tail gate, said valve being actuatable by a manually regulable rocker shaft which is simply bracketed on the rear intermediate portion of the stated tail gate.

Other objects, features and advantages will become more readily apparent from the following description and the accompanying sheet of illustrative drawings.

In the drawings, wherein like numerals are employed to designate like parts throughout the views:

Figure 1 is a rear end elevation of a dump truck constructed in accordance with the principles of the present invention, that is, one having the various attachments in use and providing the desired valving and spreading means;

Figure 2 is a fragmentary side view on a small scale, with certain parts omitted but showing the structure seen in Figure 1, observing the same in a direction from left to right;

Figure 3 is a fragmentary sectional and elevational view on a slightly enlarged scale taken on the vertical line 3—3 of Figure 1, looking in the direction of the arrows;

Figure 4 is a view like Figure 3, but showing the dump body tilted for dumping and with the tail gate swung to open material discharging and spreading position;

Figure 5 is a detail elevational view of the inside or front side of the tail gate showing the auxiliary baffle plates and the manner in which they are bolted in place;

Figure 6 is a perspective view of one of the auxiliary baffle plates removed; and Figure 7 is a perspective view of the principal or main spreader attachment or unit also removed from the truck.

In the drawings, the dump truck, which is conventional or more or less standard in type is denoted generally by the numeral 10. Although it includes other parts, all that is necessary is to refer, it is believed, to the frame structure 12 (Figure 4) hinged on the complemental chassis 14, as at 16, the chassis having customary supporting wheels. There are dual wheels shown in Figure 1, and only the tires of the outermost wheels are mentioned in that they come into the picture, so to speak. These tires are denoted by the numerals 18–18. Referring to Figures 3 and 4, the bed or bottom of the truck is denoted by the numeral 20, and this has a discharge edge 22 at the rear end. The side walls cooperating with and rising vertically from the bottom are denoted by the numerals 24. The tail gate, which is primarily of standard construction, is denoted by the numeral 26. It is hinged at the upper ends at the side walls, as at 28, and is adapted to be swung in the usual way, and it is held by any suitable chain 30. The usual gate comprises a plate or panel 32 having top and bottom horizontal stiffeners 34 and 36 and provided at its ends with wing-like closure members 38 which telescope into the truck body. In keeping with the present invention, there is a third stiffener 40 provided and this is an added detail forming a part of the invention and it is attached to the panel on the rear side just above the stiffener 36. Then, there is a slot formed in the panel which registers with a complemental slot 42 wherein the stiffeners 36 and 40 provide guides, that is, guides for a valving knife or blade 44 which works back and forth through the slot and is said to be retractible and projectible. It cooperates with the rear edge 22 so that when the gate is open, a discharge opening or gap is provided, as at 46, in Figure 4. The valve blade, when closed, projects beneath the lip-like end 22, in the manner shown in Figure 3, and when it is open, it occupies the position shown in Figure 4. There is a rock shaft at 48 which is horizontally disposed and mounted in bearing brackets 50 which are attached to the end portions of the tail gate. At one end, the rock shaft is provided with an accessible operating handle 52. Intermediate its ends, it is provided with several links or arms which are fixed rocker arms 54 and have slotted lower ends 56 operatively connected at 58 to the adjacent edge portions of the valving blade, all in the manner shown.

The principal or main spreader and distributing unit, this in the form of a readily applicable and removable attachment, is denoted by the numeral 60 and is seen perhaps best in Figure 7, where it comprises a vertical baffle plate 62 provided with angle brackets 64-64 which are bolted in place on the frame of a truck, as at 66 in Figures 3 and 4. This plate provides a sort of apron, and it depends at right angles from and beneath the overhanging lip or rear discharge end 22. It is provided at its lower portion with a lateral ledge forming flange which is preferably arcuate or longitudinally bowed. The central crown portion is denoted at 68 and the deflecting and distributing terminal end at 70-70, and these are on a plane well below the crown 68. They extend outwardly to and perhaps a little beyond the outer side walls of the tires 18-18, as best shown in Figure 1, to obtain the wide range spreading results desired. The spreader flange is, of course, directly beneath the gap 46, as brought out in the drawings, so that as the material is shunted out, it descends and gravitates against and spreads over the surfaces of the flange in an obvious manner. In addition, I provide auxiliary baffle plates. These are sector-shaped and are shown in Figure 6, wherein each is denoted by the numeral 72. They have attaching flanges 74 which underlie the lower edge of the tail gate and are bolted thereto, as at 76. These baffle plates descend in spaced parallelism with the baffle plate or apron 62 when the gate is closed, as shown in Figure 3. They cooperate with the fixed baffle plate in forming a sort of a channel-like receiver and they constitute guards against excessive spilling of loose-type aggregate. The numerals 78 are merely clearence notches for existing or stock parts.

It will be seen, therefore, that the baffle units are readily applicable and removable parts susceptible of being expeditiously bolted on the stock parts without alteration or removed whenever necessary or desired. The tail gate is simply modified to add the additional stiffener 40 and the slot, the valving plate or blade and its operating means being in the form of an attachment which is also readily applicable and removable. Thus, a conventional dump truck can be converted into a dump truck with valving and spreader means. It is, of course, within the purview of the invention to construct a truck at the factory with these facilities, which means that the claims are directed to both the combination and subcombination aspects of the over-all inventive concept.

With the dump body in its normal horizontal position and the tail gate closed and locked, the body is loaded, as usual, with gravel or ready-to-use rock. The tail gate chains are set in a manner to allow the tail gate to open to the maximum allowable extent which will permit the blade valve or knife to completely close the opening or gap. Then, the tail gate is unlocked and the material in the dump body forces it open and it remains open. The blade valve is kept closed manually by use of the handle as shown. The material is now ready to be spread. (In asphalt paving work, it is important that the spread be as wide as the truck tires to keep them from "picking up" the asphalt and rolling it on the tires. Therefore, in this work, the truck is backed over the fresh asphalt spreading the cover material and running on it.) The truck is backed over the strip to be covered and a man walks near the tail gate to use the handle controlling the knife blade or valve. At the point where the spread is to start, the man opens the valve and regulates it until the material is being spread to the desired thickness. The thickness of the spread is normally regulated by both varying the speed of the truck and by regulating the tail gate opening with the valving blade. As material continues to be spread, the dump body is raised at intervals to ensure a full supply of material available at the tail gate. Depending on the skill of the truck driver and the man regulating the knife valve, further manipulation of the latter after it is first opened is practically unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a wheel supported dump truck body having an openable material dumping end and including a horizontal bottom providing a bed and vertical side confining walls cooperable therewith, a rearwardly and outwardly swingable tail gate hinged at its upper end between the upper portions of said side walls, a vertical baffle plate attached to and depending from the rear end of said bottom with its ends projecting outwardly and beyond said side walls, said plate having a lateral rearwardly projecting flange providing a shelf-like spreading and distributing ledge, said flange being of a length commensurate with the length of the baffle plate, whereby when the lower end of the tail gate opens and the material starts to flow, it empties through the then existing space or gap between the body bottom and lower edge portion of said tail gate and gravitates onto said ledge to distributively spread itself in an even and orderly manner for delivery to the road or other surface acted on, said tail gate being provided with a lengthwise slot in a plane which is in general alignment with said bottom and is therefore cooperable with said bottom, and a blade valve located in and operable in said slot, and manually actuatable means on the rear side of said tail gate and operatively connected to and thus controlling the functioning of said blade valve.

2. In combination, a wheel supported dump truck body having an openable material dumping end and including a horizontal bottom providing bed and vertical side walls cooperable therewith, a rearwardly and outwardly swingable tail gate hinged at its upper end between the upper portions of said side walls, said tail gate having a horizontal slot substantially equal in length to the width of said bottom, said slot in a plane which is cooperable with the bed surface of said bottom, a blade valve operable in and through said slot with its forward end movable toward and from the rear edge of said bottom, a rock shaft mounted for rotation on the rear side of said tail gate and having rocker arms operatively connected with said blade, and a handle carried by said rock shaft.

3. The structure defined in claim 2, and the combination therewith of a vertical baffle plate attached to and depending from the rear end of said bottom with its ends projecting outwardly and beyond said side walls, said plate having a lateral rearwardly projecting flange providing a shelf-like spreading and distributing ledge, said flange being of a length commensurate with the length of the baffle plate, whereby when the lower end of the tail gate opens and the material starts to flow, it empties through the then existing space or gap and gravitates onto said ledge to distributively spread itself in an even and orderly manner for delivery to the road or other surface acted on.

4. The structure defined in claim 3 and the combination therewith of auxiliary vertical baffle plates secured to and depending from the bottom portion of said tail gate, said plates being parallel to and spaced rearwardly from said first named baffle plate when the tail gate is fully closed, and constituting anti-spill guards by way of their cooperation with said first named baffle plate and the flange thereon.

References Cited in the file of this patent

UNITED STATES PATENTS

| | | |
|---|---|---|
| 1,876,409 | Gordon | Sept. 6, 1932 |
| 1,994,672 | Smith | Mar. 19, 1935 |
| 2,005,896 | Hurt | June 25, 1935 |
| 2,093,953 | Burchett | Sept. 21, 1937 |
| 2,678,216 | Gandrud | May 11, 1954 |

FOREIGN PATENTS

| | | |
|---|---|---|
| 818,246 | France | Sept. 21, 1937 |